United States Patent [19]
Roberts

[11] Patent Number: 4,917,321
[45] Date of Patent: Apr. 17, 1990

[54] CENTRIFUGAL BRAKE ARM AND RETAINER

[75] Inventor: Dennis E. Roberts, Owasso, Okla.

[73] Assignee: Zebco Corporation, Tulsa, Okla.

[21] Appl. No.: 184,820

[22] Filed: Apr. 22, 1988

[51] Int. Cl.[4] ............................................. A01K 89/02
[52] U.S. Cl. ................................................... 242/289
[58] Field of Search .......... 242/84.1 R, 84.3, 84.52 C; 188/184, 185; 403/355, 356, 378, 282; 464/77, 101

[56] References Cited

U.S. PATENT DOCUMENTS

| | | | |
|---|---|---|---|
| 2,150,477 | 3/1939 | Wright | 242/84.1 R X |
| 2,489,447 | 11/1949 | Borgström | 242/84.52 C |
| 2,865,662 | 12/1958 | Nurmse | 242/84.2 R |
| 3,901,457 | 8/1975 | Turesson | 242/84.52 C |
| 3,986,678 | 10/1976 | Coquelet et al. | 242/84.52 C |
| 4,034,859 | 7/1977 | Moosberg | 242/84.52 C X |
| 4,209,141 | 6/1980 | Karlsson | 242/84.52 C |
| 4,601,438 | 7/1986 | Young | 242/84.52 C |

Primary Examiner—Joseph J. Hail, III
Attorney, Agent, or Firm—Wood, Dalton, Phillips Mason & Rowe

[57] ABSTRACT

A brake system for use in a fishing reel of the type having a housing and a spool mounted for rotation relative to the housing about an axis. The brake system consists of a brake surface on the housing, a brake arm having a brake pad, with a brake surface press fit structure for retaining the brake arm in operative position on the spool for rotation therewith, and structure mounting the brake pad on the brake arm so that the brake surface on the brake pad moves biasably against the housing brake surface under a predetermined centrifugal force developed through rotation of the spool.

14 Claims, 1 Drawing Sheet

CENTRIFUGAL BRAKE ARM AND RETAINER

FIELD OF THE INVENTION

The present invention relates to centrifugal brake systems on fishing reels and, more particularly, to structure for mounting a brake arm on a rotatable, line-carrying spool.

BACKGROUND ART

Centrifugal brake systems are commonly used on casting reels to prevent backlash as may frequently occur with the line-carrying spool rotating at high velocities. Commonly, a brake arm is mounted on the spool for rotation therewith and has an associated brake pad that is urged radially outwardly against a brake surface on the reel housing by centrifugal forces produced by the rotation of the spool.

It is a known practice to mount the brake arm onto a shaft on the spool. It is also known to machine an opening in the shaft to facilitate mounting of the brake arm thereon. This conventional structure has a number of drawbacks.

Machining of the shaft as by the provision of a through opening, inherently weakens the shaft.

Further, the machining of the shaft complicates the manufacturing process and resultingly increases the attendant costs.

SUMMARY OF THE INVENTION

The present invention is specifically directed to overcoming the above enumerated problems in a novel and simple manner.

The brake system according to the present invention is contemplated for use in a fishing reel of the type having a housing and a spool mounted for rotation relative to the housing about an axis. The brake system consists of a brake surface on the housing, a brake arm having a brake pad with a brake surface, press fit structure for retaining the brake arm in operative position on the spool for rotation therewith, and structure mounting the brake pad on the brake arm so that the brake surface on the brake pad moves biasably against the housing brake surface under a predetermined centrifugal force developed through rotation of the spool.

Assembly of the brake arm on the reel spool is facilitated by the press fit retaining structure. In a preferred form, the retaining structure is a plastic retaining ring with a through bore dimensioned so that the ring closely grips a shaft on the spool and is slidable axially therealong.

The invention has as another of its objectives to provide a simplified brake arm configuration that facilitates its manufacture. The brake arm can be made as a formed, single piece of wire with one or more radially projecting legs for carrying a corresponding number of brake pads. The wire is formed with a curved portion with a surface to closely engage the spool shaft. The retaining ring configuration permits the curved surface to extend through less than 360° and preferably through approximately 180°.

More particularly, the ring has an undercut that conforms to the brake arm and defines a surface that closely captures the brake arm against a facing surface on the spool. The undercut arrangement permits a slot to be formed in the ring to accept a radially projecting portion of the brake arm and thereby prevent relative rotation between the ring and brake arm. The annular surface on the ring closer to the axially spacing spool surface can be made to seat facially against the spool surface to stabilize the position of the ring. With the undercut arrangement on the ring, the curved portion of the brake arm can be squeezed positively between the ring and the spool shaft.

DETAILED DESCRIPTION OF THE DRAWINGS

Figure 1:
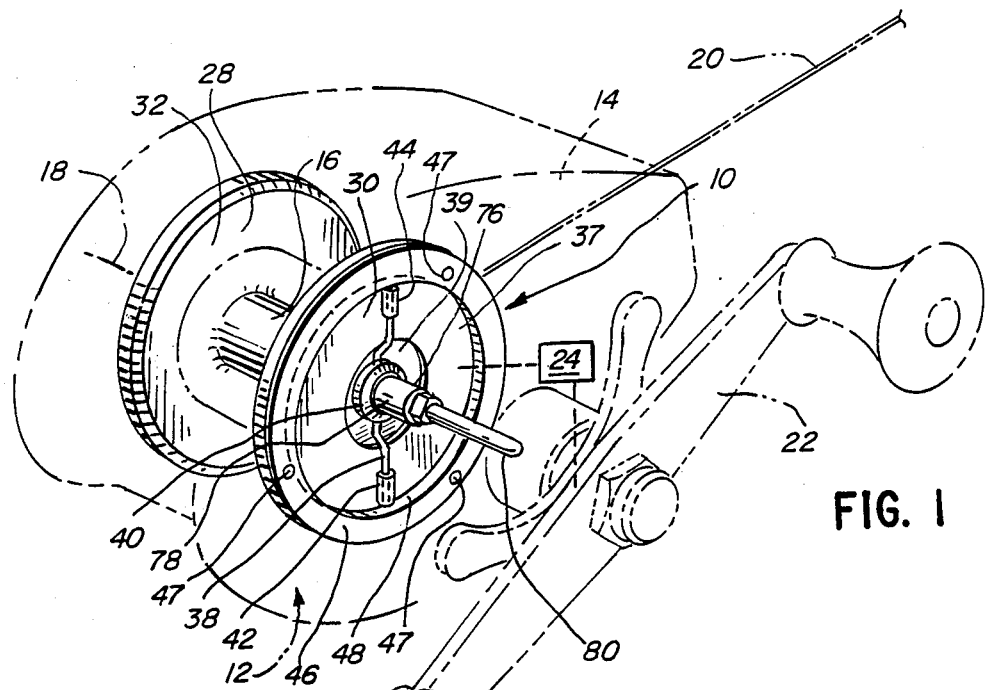
FIG. 1 is a perspective view of a fishing reel with a centrifugal brake system for a line carrying spool according to the present invention.

In FIG. 1 a preferred form of brake system according to the present invention is shown at 10 on a conventional style casting reel, shown in phantom at 12. The reel 12 has a housing 14 which mounts a line-carrying spool 16 for rotation about a laterally extending axis 18. The spool 16 carries a supply of line 20 which is retrieved through operation of a crank handle 22. Rotation of the crank handle 22 imparts rotation to the spool 16 about axis 18 through a conventional gear mechanism, identified schematically as 24.

A detailed description of the structure and overall operation of the reel 14 is unnecessary to understand the present invention. It is only necessary to understand that with the reel 12 in a cast mode, the spool 16 is substantially unrestrained in rotation by other than the brake system 10.

The spool 16 has a cylindrical hub 26 which blends into axially spaced, radially enlarged flanges 28, 30. The flanges 28, 30 have facing surfaces 32, 34 bounding in conjunction with the hub 26 and line storage space 36. The end face 37 of the spool 16 has a recessed center portion 39.

The brake system 10 generally consists of a brake arm 38, a retainer ring 40 for maintaining the brake 38 on the spool 16, movable brake pads 42, 44 on the brake arm 38, and a brake ring 46 fixedly attached to the reel housing 14 as by rivets 47 and having an annular surface 48 cooperating with the movable brake pads 42, 44.

The brake arm 38 is a formed piece of wire. The wire has a C-shaped mounting portion 50 seated in the recessed portion 39 of the spool. The mounting portion has axially offset portions 52, 54 extending radially therefrom and terminating in radially projecting legs 56, 58 that are supported in cantilever fashion so that the free ends 60, 62, respectively thereof, are in close proximity to and in axially overlapping relationship with the braking surface 48 on the reel housing 14. The brake arm 38 is held in the operative position of FIG. 1 against the axially outwardly facing surface 64 of the flange 30 by retainer ring 40, as will be described more fully below. The end face 37 of the spool either could be flat or could have an axially extended raised portion, in either event the brake arm C-shaped portion would be offset only slightly at 52, 54 or would extend straight into legs 56, 58 without any offset, respectively.

The brake pads 42, 44 are each cylindrical with through bores 66, 68 to accept legs 56, 58, respectively, in relatively loose fashion so that the pads 42, 44 are slidable radially back and forth along the legs 56, 58, as shown by arrows 70, towards and away from the braking surface 48. With the spool 16 stationary, the pads 42, 44 move on the brake arm 38 under the influence of gravity. At a predetermined rotational velocity of the spool 16, the pads 42, 44 move radially outwardly on the brake arm 38 so as to bring annular brake surfaces 71, 72 respectively thereon into engagement with the brake surface 48 on the reel housing 14. The friction forces developed between the pads 42, 44 and surface 48 prevent unrestrained rotation of the spool 16 and thereby prevent backlash, as during a cast.

Figure 2:
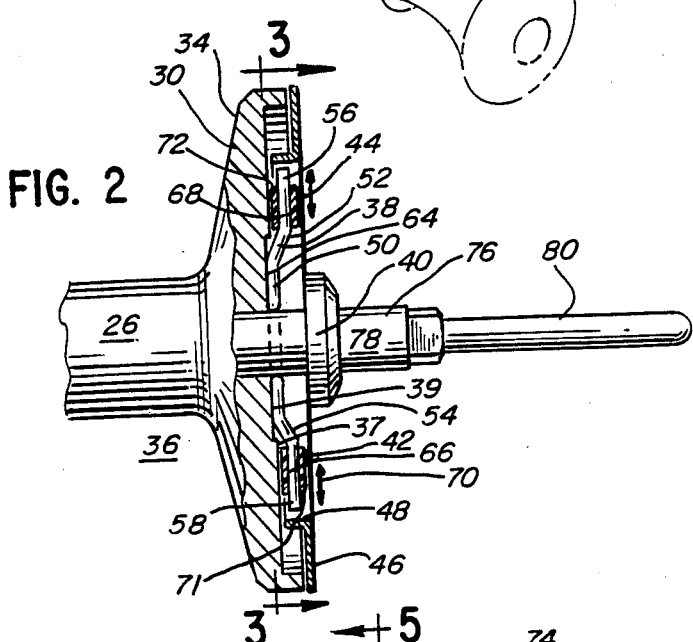
FIG. 2 is an enlarged, fragmentary elevation view of a portion of the spool with a retaining ring for a brake arm on the brake system in a release position.
Figure 3:
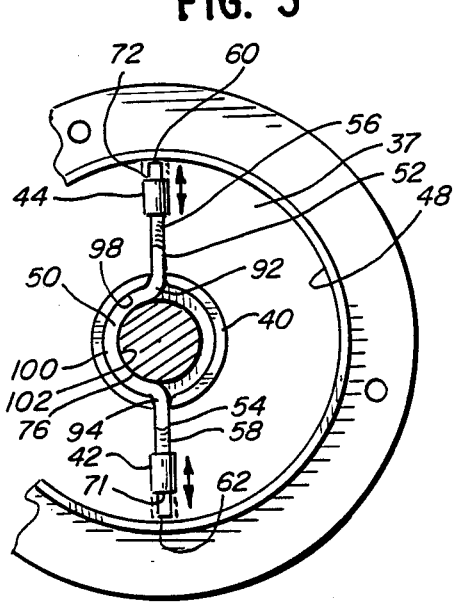
FIG. 3 is a partial section view of the brake arm and retaining ring taken along line 3—3 of FIG. 2.
Figure 4:
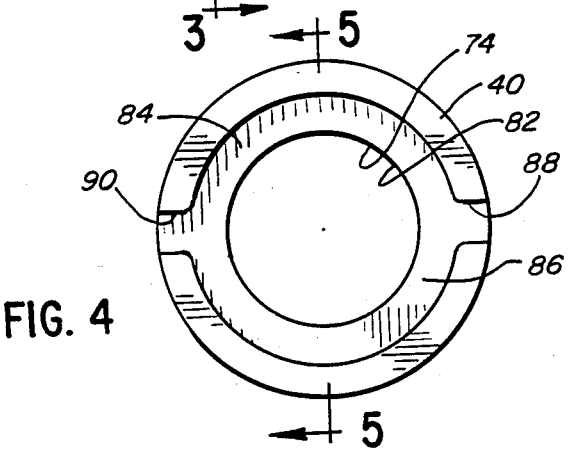
FIG. 4 is an enlarged, side elevation view of the retaining ring.

With the inventive structure, it is possible to simply assemble the brake arm 38 and, if desired, to remove the same. The ring 40, which retains the brake arm 38 in its operative position, is preferably a molded plastic piece. The ring 40 has a through bore 74, closely dimensioned to the outer surface 76 of that portion 78 of a stepped shaft 80 extending through the spool 16 and supporting the spool 16 for rotation on the housing 14. The surface 82 defining the ring bore 74 closely grips the shaft portion 78 and permits sliding movement relative to the shaft between a release position shown in FIG. 2 and a retention position shown in FIG. 1.

The ring 40 has an annular undercut 84 defining a first, flat, annular surface 86 which, in a retention position for the ring 40, captures the mounting portion 50 on the brake arm 38 against the surface 64 on the spool 16. Relative rotation between the ring 40 and brake arm 38 is prevented by providing diametrically opposite slots 88, 90 to accept radially projecting portions 92, 94 of the brake arm mounting portion 50.

Figure 5:
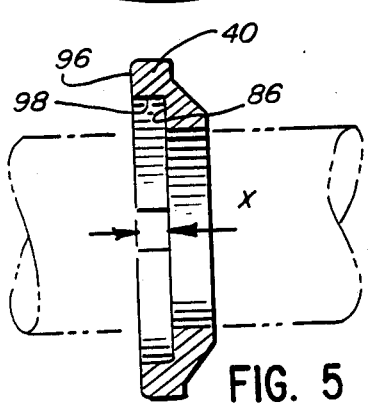
FIG. 5 is a section view of the retaining ring along line 5—5 of FIG. 4.

In a preferred form, the diameter of the wire from which the brake arm 38 is formed is approximately equal to the depth X (FIG. 5) of the undercut so that with the ring 40 in the retention position, a second annular surface 96 parallel to the surface 86 facially engages the spool flange surface 64. This stabilizes the ring 40 on the reel in the retention position of FIG. 1.

The radially inwardly facing surface 98 of the undercut conforms closely to the outer curved surface 100 of the mounting portion 50 of the brake arm 38. The radially inwardly facing curved surface 102 on the mounting portion 50 closely conforms to the outer surface 76 of the shaft portion 78. With the ring 40 in its retention position, the mounting portion 50 is squeezed between the surface 98 on the ring 40 and the outer surface 76 of the shaft 80.

Because the mounting portion 50 of the brake arm 38 extends through less than 360°, a wire can be simply formed to the brake arm configuration in the drawings. That is, the wire does not have to be doubled back on itself as it would be as if it completely surrounded the spool shaft 80. The invention does, however, contemplate a curved mounting portion extended through more than 180°.

Assembly of the brake arm 38 is facilitated by the inventive structure. One need only place the brake arm 38 against the spool flange 30 and slide the ring 40 into place. The ring 40 cooperates with the spool flange 30 and shaft 80 to positively and precisely retain the brake arm 38 on the spool 16.

I claim:

1. A centrifugal brake system for a line-carrying spool on a fishing reel of the type having a housing and means for supporting the spool on the housing for rotation relative to the housing about an axis, said brake system comprising:
    a brake surface on said housing;
    a brake arm having a brake pad;
    press fit means for retaining the brake arm in operative position on the spool for rotation therewith;
    a brake surface on the brake pad; and
    means mounting the brake pad on the brake arm for movement of the brake surface on the brake pad biasably against the housing brake surface under a predetermined centrifugal force developed through rotation of the spool,
    wherein said spool has a shaft and said retaining means comprises a ring with a bore to closely frictionally accept the spool shaft,
    wherein said spool has an axially facing surface, the ring is mounted for translatory axial movement relative to the spool shaft between a release position wherein the brake arm can be placed in and removed from operative position on the spool and a retention position, said ring has a first surface and with the ring in the retention position the brake arm is captively retained between the first ring surface and spool surface.

2. The centrifugal brake system according to claim 1 wherein said brake arm has a mounting portion and a leg projecting radially with respect to the spool from the mounting portion with the brake arm in operative position on the spool, said ring has a second surface facing axially with respect to the spool, spaced axially with respect to the first ring surface, and seating against the spool surface with the ring in a retention position.

3. The centrifugal brake system according to claim 2 wherein said brake arm comprises a formed piece of wire.

4. The centrifugal brake system according to claim 3 wherein said wire has a curved portion on said mounting portion with a surface on said curved portion bearing against the spool shaft with the ring in a retention position.

5. The centrifugal brake system according to claim 4 wherein said curved portion extends through less than 360°.

6. The centrifugal brake system according to claim 4 wherein said curved portion extends through approximately 180°.

7. The centrifugal brake system according to claim 2 wherein there is a slot in the ring and the leg extends with the slot so that relative rotation between the ring and brake arm about the spool axis is limited.

8. A centrifugal brake system for a line-carrying spool on a fishing reel of the type having a housing and means for supporting the spool on the housing for rotation relative to the housing about an axis, said brake system comprising:
    an annular radially inwardly facing brake surface on said housing;
    a brake arm;
    press fit means separate from and movable relative to said brake arm for retaining the brake arm in operative position on the spool for rotation therewith;
    a brake pad with a brake surface;
    means mounting the brake pad on the brake arm with the brake pad surface facing the housing brake surface for translatory radial movement relative to the brake arm between (a) a brake position wherein the brake pad surface is biased against the brake surface on the housing with a predetermined force by centrifugal force on said brake pad developed through rotation of the spool at a predetermined speed and (b) a release position wherein the brake pad surface is biased against the brake surface on the housing with less than said predetermined force with the spool rotating at leass than said predetermined speed wherein said brake arm comprises a formed piece of wire having a curved portion which seats against the spool shaft with the support arm in operative position on the spool.

9. The centrifugal brake system according to claim 8 wherein said retaining means comprises a plastic ring.

10. The centrifugal brake system according to claim 8 wherein said spool has a shaft and the retaining means comprises a ring with a through bore to closely accept the spool shaft to permit sliding movement of the ring axially of the shaft.

11. The centrifugal brake system according to claim 8 wherein said curved surface extends through less than 360°.

12. The centrifugal brake system according to claim 8 wherein the ring has a radially inwardly facing annular surface between the first and second surfaces and with the ring in the retention position, the curved wire portion is squeezed between said inwardly facing annular surface and the spool shaft.

13. A centrifugal brake system for a line-carrying spool on a fishing reel of the type having a housing and means for supporting the spool on the housing for rotation relative to the housing about an axis, said brake system comprising:
   an annular radially inwardly facing brake surface on said housing;
   a brake arm;
   press fit means for retaining the brake arm in operative position on the spool for rotation therewith;
   a brake pad with a brake surface;
   means mounting the brake pad on the brake arm with the brake pad surface facing the housing brake surface for translatory radial movement relative to the brake arm between (a) a brake position wherein the brake pad surface is biased against the brake surface on the housing with a predetermined force by centrifugal force on said brake pad developed through rotation of the spool at a predetermined speed and (b) a release position wherein the brake pad surface is biased against the brake surface on the housing with less than said predetermined force with the spool rotating at less than said predetermined speed,
   wherein said spool has a shaft and the retaining means comprises a ring with a through bore to closely accept the spool shaft to permit sliding movement of the ring axially of the shaft,
   wherein the spool has an axially facing surface, said ring has first and second annular, substantially parallel flat surfaces and said retaining means includes means mounting the ring for translatory movement relative to the spool shaft between (a) a release position wherein the brake arm can be placed in and removed from operative position on the spool and (b) a retention position wherein said brake arm is held captive between the spool surface and the first surface, said second surface residing axially closer to the spool surface than the second surface with the ring in the retention position.

14. The centrifugal brake system according to claim 13 wherein said ring has a slot extending between the first and second ring surfaces to accept the brake arm leg and prevent relative rotation between the brake arm and ring.

* * * * *